Figure 1:
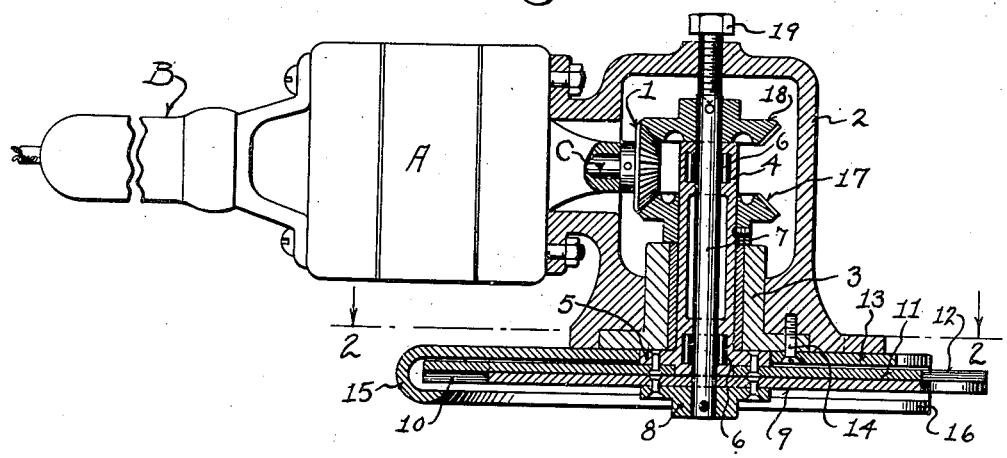

June 8, 1948.        A. A. DISHMAKER        2,443,027
HEDGE TRIMMER
Filed Oct. 25, 1944

INVENTOR
ANTON A. DISHMAKER

BY
ATTORNEYS

Patented June 8, 1948

2,443,027

UNITED STATES PATENT OFFICE 2,443,027

HEDGE TRIMMER

Anton A. Dishmaker, Waupaca, Wis.; Orville A. Dishmaker, executor of said Anton A. Dishmaker, deceased Application October 25, 1944, Serial No. 560,279

3 Claims. (Cl. 30—206)

My invention refers to hedge trimmers and it has for its primary object to provide a simple, durable hedge trimmer provided with a pair of motor driven rotary cutting discs, the same being rotated in opposite directions and having a plurality of cutting teeth, said cutting teeth preferably running in actual contact with each other or spaced apart slightly as might be found necessary in cutting various material.

While I have given my invention the title of hedge trimmer, it can also be used for cutting grass, hay, sticks or stalks of most any type of vegetation where applicable and, with modified blades or conventional circle saws, also running in opposite directions, will eliminate the accident hazard so common to them when running in one direction only when a board or other material is presented to be cut. The opposing action of two cutters provides a neutral cutting condition.

A specific object of my invention is to provide a motor having an attached gear housing with a shaft and sleeve journaled therein and carrying oppositely rotated cutting discs and a guard fixed to the housing above the companion discs.

Another object of my invention is to provide a motor having a housing attached thereto, a shaft and a sleeve journaled in the housing in gear connection with the motor, with cutting discs mounted upon the sleeve and shaft in juxtaposition to each other, and a guard fixed to the housing above the knife discs, the guard being provided with two or more spaced fingers forming between the same a cutting sector. The guards merely serving to gather the material and to serve as a protection for the operator, but not to serve as a cutting or shearing edge.

With the above and other minor objects in view, my invention consists in certain peculiarities of construction and combination of parts as will be fully set forth hereinafter with reference to the accompanying drawings and subsequently claimed.

Figure 2:
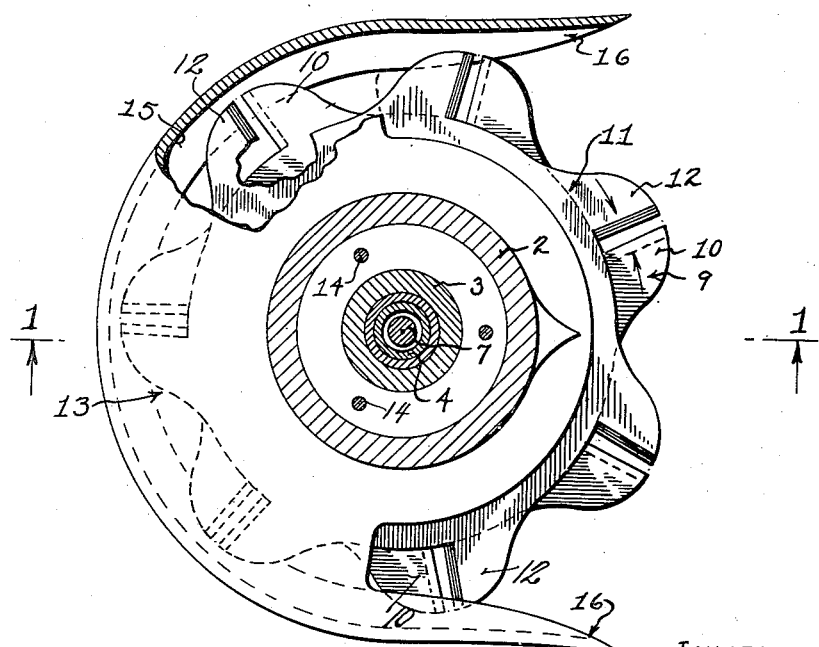

In the drawings:

Figure 1 represents a sectional elevation of a hedge trimmer embodying the features of my invention, the section being indicated by line 1—1 of Figure 2. And Figure 2 a sectional plan view of the same, the section being indicated by line 2—2 of Figure 1.

Referring by characters to the drawings, A indicates an electric motor having a suitable handle B. The motor shaft C carries a beveled gear 1, which beveled gear is encased in a housing 2 secured to the head of the motor.

The bottom of the housing is provided with a shouldered opening into which is secured a flanged bushing 3. Mounted in the bushing is a sleeve 4 having a flange 5, the upper and lower portions of the sleeve being provided with anti-friction bearings 6—6. The bearings engage a shaft 7, the bottom end of which shaft has secured thereto a flanged hub 8. The flanged hub 8 has riveted thereto a circular cutter disc 9, the periphery of which disc is formed with projecting cutter teeth 10.

The flange 5 of the sleeve 4 has riveted thereto a cutter disc 11, which disc is similar to the cutter disc 9 except that its projecting cutter teeth 12 are positioned opposite the cutter teeth 10. The companion cutter discs are faced one upon the other with a slight clearance to eliminate friction, or can be spaced apart as needed.

In order to protect the cutter discs a circular shield 13 is fitted and secured to the bottom of the housing by screws 14, which screws also serve as means for securing the bushing to said housing.

As best illustrated in Figure 2 of the drawings, the top wall of the shield is cut away at the front a predetermined distance and its periphery is curled over to form a guard 15 for the cutter discs. The curled guard terminates with forwardly extended guard fingers 16, which fingers, in conjunction with the cut-away wall of the shield, expose the cutter teeth of the disc and, in effect, develop a cutting sector. The fingers 16 of the guard serving as guides to direct the hedge tips into the knives.

The cutter discs are driven in opposite directions by a beveled gear 17 secured to the sleeve 4, and a companion beveled gear 18 secured to the shaft which projects beyond the sleeve. These gears are in mesh with the motor gear 1 and when power is applied to the nest of gears, the companion cutter discs are rotated in opposite directions.

As noted in Figure 1, the upper head of the housing 2 carries a set bolt 19, which set bolt is tapered at its end and nested into a corresponding socket in the end of the shaft 7, the same serving as a bearing and also to eliminate end thrust.

Referring to Figure 2 of the drawings, it will be noted that each disc is provided with undercut or rake type cutting teeth tangent to the axis, which provide a cutting action presenting an angular shearing relation between opposed teeth also, thereby drawing the material being cut into the revolving cutters rather than to exclude it as would happen if the teeth were cut with radial or negative tangent edges.

While I have shown and described one complete exemplification of my invention minutely as to detail, it is understood that I may vary the structural features within the knowledge of the skilled mechanic and as broadly interpreted by the claims:

I claim:

1. A cutting device comprising a pair of concentrically mounted cutting discs, a motor, a gear connection between the cutting discs and motor for rotating said discs in opposite directions, and a shield for the discs carried by the motor having spaced guard or guiding fingers.

2. A motor having a shaft, a gear housing secured to the end of the motor, a shaft mounted therein, a sleeve over the shaft, bearings carried by the housing for the sleeve and shaft, gears connecting the sleeve, shaft and motor shaft, toothed cutting discs secured to the sleeve and shaft below the housing, and a cutter shield secured to the housing having divider fingers spaced apart to form a knife cutting sector.

3. A motor having a shaft, a gear housing secured to the end of the motor, a shaft mounted therein, a sleeve encasing the shaft, bearings carried by the housing for the sleeve and shaft, gears connecting the sleeve, shaft and motor shaft, to the cutting disc secured to the sleeve and shaft below the housing, and a guard shield secured to the housing terminating with collecting fingers for directing material into the cutting area of the toothed disc.

ANTON A. DISHMAKER.

REFERENCES CITED

The following references are of record in the file of this patent:

UNITED STATES PATENTS

| Number | Name | Date |
|---|---|---|
| 660,281 | Traphagen | Oct. 23, 1900 |
| 854,468 | Crosby | May 21, 1907 |
| 997,218 | Thompson | July 4, 1911 |
| 1,130,283 | Hewett et al. | Mar. 2, 1915 |
| 1,275,851 | Comfort | Aug. 13, 1918 |
| 1,904,390 | Sohn | Apr. 18, 1933 |